United States Patent
Gupta

(10) Patent No.: US 9,497,457 B1
(45) Date of Patent: Nov. 15, 2016

(54) REPACKING OF PANORAMIC VIDEO BASED ON STANDARD IMAGE FORMATS

(71) Applicant: Altia Systems, Inc., Cupertino, CA (US)

(72) Inventor: Yashket Gupta, Santa Clara, CA (US)

(73) Assignee: ALTIA SYSTEMS INC, Cupertino, CA (US)

(*) Notice: Subject to any disclaimer, the term of this patent is extended or adjusted under 35 U.S.C. 154(b) by 406 days.

(21) Appl. No.: 14/058,187

(22) Filed: Oct. 18, 2013

Related U.S. Application Data

(60) Provisional application No. 61/715,818, filed on Oct. 18, 2012.

(51) Int. Cl.
- *H04N 7/00* (2011.01)
- *H04N 19/40* (2014.01)
- *H04N 19/174* (2014.01)
- *H04N 19/70* (2014.01)

(52) U.S. Cl.
CPC .. *H04N 19/00472* (2013.01); *H04N 19/00272* (2013.01); *H04N 19/00884* (2013.01)

(58) Field of Classification Search
CPC ............... H04N 5/23238; H04N 21/21805; H04N 21/4728; H04N 13/00
See application file for complete search history.

(56) References Cited

U.S. PATENT DOCUMENTS

| | | | |
|---|---|---|---|
| 6,430,317 B1* | 8/2002 | Krishnamurthy | H04N 19/43 382/236 |
| 8,223,845 B1* | 7/2012 | Duvivier | H04N 19/80 375/240.24 |
| 2008/0106593 A1* | 5/2008 | Arfvidsson | G06T 3/0062 348/39 |
| 2010/0002004 A1* | 1/2010 | Raghunath | G06F 17/2223 345/467 |
| 2010/0128797 A1* | 5/2010 | Dey | H04N 19/176 375/240.24 |

* cited by examiner

*Primary Examiner* — Huy T Nguyen

(74) *Attorney, Agent, or Firm* — HM Law Group LLP; Vani Moodley, Esq.

(57) ABSTRACT

A method encoding panoramic video is enclosed. The method comprises: determining repacking parameters for repacking input panoramic video into corresponding encoded panoramic frames without down-scaling; performing a repacking operation to repack the input panoramic video into the encoded panoramic frames.

17 Claims, 12 Drawing Sheets

300

| Format Type | Image Format | Height | Width |
|---|---|---|---|
| Standard | 1080p | 1920 | 1080 |
| Standard | 720p | 1280 | 720 |
| Standard | 2160p or 4K | 3840 | 2160 |
| Non Standard | PanaCast | 2689 | 540 |
| Non Standard | PanaCast - Dual HD | 4096 | 1080 |

Effects of using Down Scaling while maintaining aspect ratio results in a frame with most of the region blacked out and a small slit like wide angle video in the middle Fig 5: Typical Design of a Image Processing Engine (Compression Engine)

The Image Processing resolution is always limited by the Width of the Local Line Buffers
Typically this width is the maximum frame width the Image processor supports

REPACKING OF PANORAMIC VIDEO BASED ON STANDARD IMAGE FORMATS

This application claims the benefit of priority to U.S. Provisional Patent Application No. 61/715,818, which was filed on Oct. 18, 2012, the entire specification of which is incorporated herein by reference.

FIELD

Embodiments of the invention relate generally to multiple imager video systems that produce panoramic images through a process of stitching multiple images together.

BACKGROUND

Panoramic imaging systems may be used to produce panoramic video with a wide field-of-view. Conventional video hardware used to view the panoramic video is designed to operate with conventional video formats, such as 1920×1080, 1280×720, etc. However, the panoramic video may be encoded in a non-standard video format which is much larger than any of the standard video formats. Viewing of the panoramic video using conventional video hardware would thus require down scaling of the panoramic video.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

In one aspect, there is provided a method for encoding panoramic video. The method comprises: determining repacking parameters for repacking input panoramic video into corresponding encoded panoramic frames without down-scaling; performing a repacking operation to repack the input panoramic video into the encoded panoramic frames.

Other aspects of the invention will be apparent from the detailed description below.

BRIEF DESCRIPTION OF THE DRAWINGS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

The present invention, in accordance with one or more various embodiments, is described in detail with reference to the following figures. The drawings are provided for purposes of illustration only and merely depict exemplary embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale. TBD FIG. 1 an example embodiment of an apparatus configured for generating panoramic images according to one embodiment of the invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
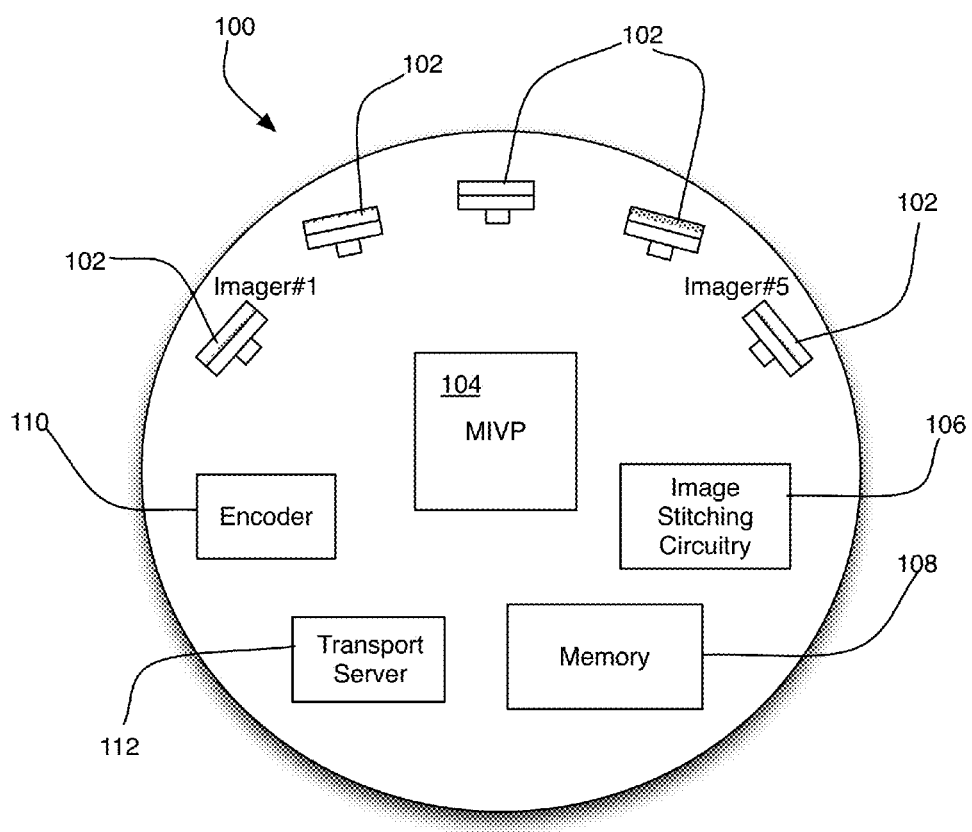

FIG. 1 illustrates an example embodiment of an apparatus configured for generating panoramic images according to one embodiment of the invention, in the form of multiple imager video system (camera) 100.

The system 100 includes multiple imagers/sensors 102 mounted along an arc such that each imager 102 is directed to capture a portion of a scene. Each imager 102 may include suitable sensors, for example charge-coupled device (CCD) or complimentary metal-oxide semiconductor (CMOS) imaging sensors, as is known in the art.

The system 100 also includes a multiple imager video processor (MIVP) 104, image stitching circuitry 106, memory 108, an encoder 110, and a one or more network interfaces 110. In one embodiment, digital signals recorded by sensors 102 are sent to MIVP 104 for processing. In one embodiment, the MIVP 104 may execute programs for implementing image processing functions and calibration functions, as well as for controlling the operation of the entire device 100 including its image capture operations. Optionally, the MIVP 104 may include signal processing functionality for performing image processing, including image filtering, enhancement and for combining multiple fields of view in cooperation with the image stitching circuitry 106, as will be explained in greater detail below. Although shown separately, in some embodiments, the image stitching circuitry 106 may exist as part of the MIVP 104. It is to be understood that components of the device 100 may take the form of hardware, software, firmware, or any combination of hardware, software, and firmware.

Digital signals representing a panoramic image may be stored in memory 108. In one embodiment, the encoder 110 may repack and compress panoramic images before transmission across via a network interface 112, as will be described in greater detail below. The network interfaces 112 may be configured to provide network connectivity to the device 100. As such, the network interfaces 112 may include wireless and wired interfaces, in accordance with different embodiments.

Figure 2:
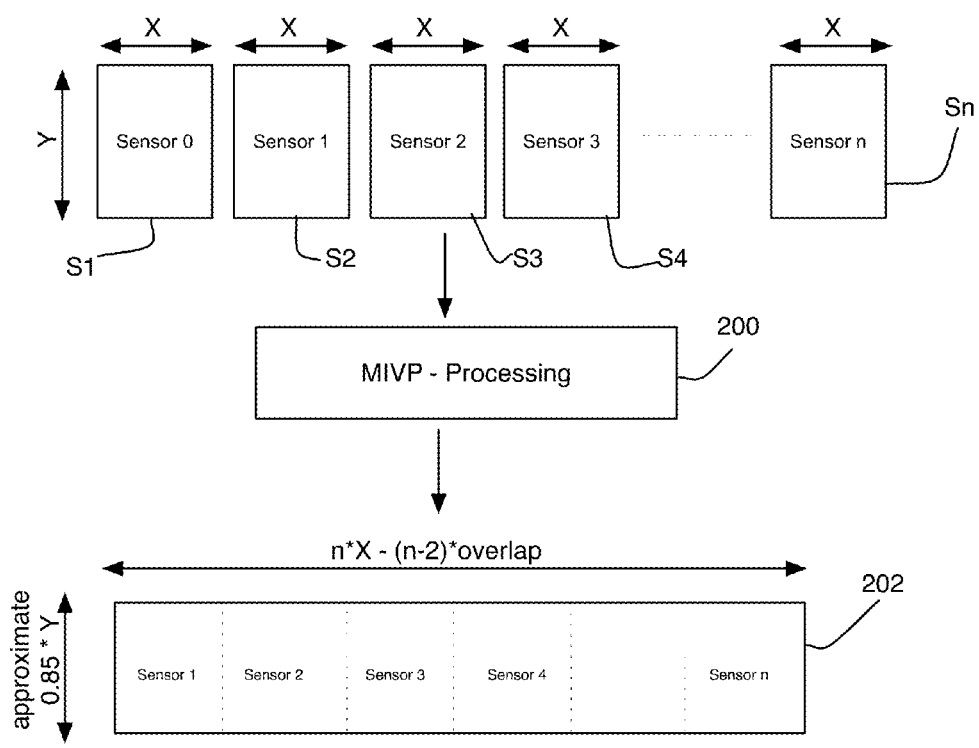
FIG. 2 shows a flowchart of a process for stitching images to produce a PanaCast frame, in accordance with one embodiment of the invention.

FIG. 2 illustrates the production of panoramic video images by the camera 100, in accordance with one embodiment. Referring to FIG. 2, images/sensor data S1 to Sn from the N imagers/sensors of the camera 100 are input into the MIVP 104. The MIVP executes block 200 wherein image stitching in cooperation with the image-stitching circuitry 106 is performed to produce stitched panoramic video. The resultant panoramic video is referred to herein as PanaCast video. FIG. 2 shows a frame 202 of the PanaCast video. If each image S1 to Sn is X pixels wide and Y pixels high, then the frame 202 is n*X−(n−2)*O wide and approximately 0.85*Y pixels high; where O is the number of overlapping pixels between the images S1 to Sn.

Figure 3:
FIG. 3 shows a table of image formats.
Figure 4:
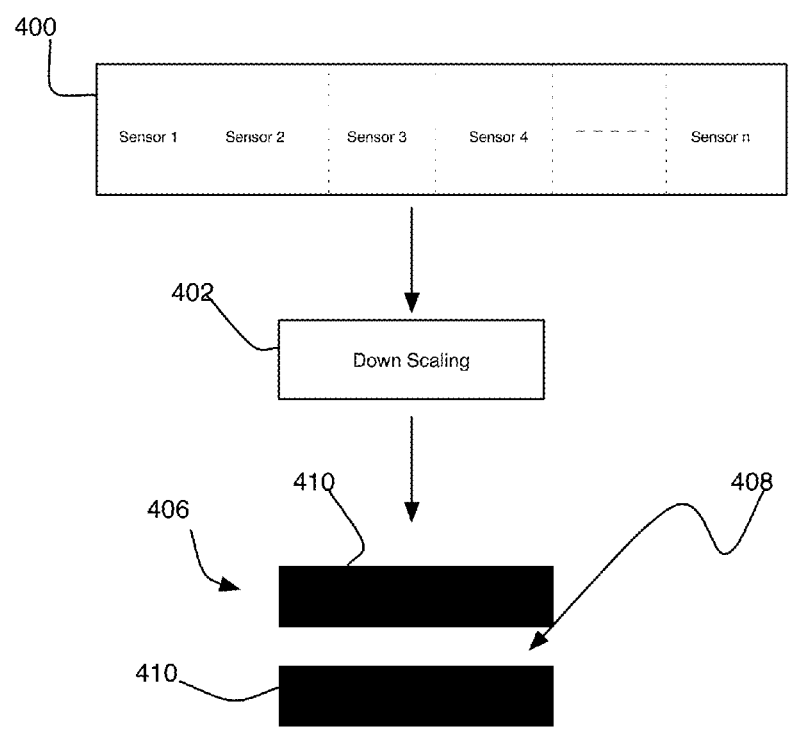
FIG. 4 illustrates the effects of down-scaling an image.

FIG. 3 shows a table 300 of the dimensions associated with standard image formats. Additionally, the table shows the formats associated with PanaCast standard video and PanaCast HD video. As will be seen the PanaCast video formats are different from the standard video formats and require more storage. Thus, in order to display PanaCast video on equipment designed for video with standard video format, the PanaCast video must be scaled down. FIG. 4 illustrates the effects of down scaling PanaCast video. Referring to FIG. 4, a 200 degree field-of-view (FOV) PanaCast frame 400 is input into a down-scaling engine 404 to produce a scaled-down PanaCast frame 406. The PanaCast frame 406 includes a slit-like portion 408 for displaying wide-angle video, and black pixel bands 410 above and below the portion 408. The introduction of the black pixel bands 410 as a result of down-scaling is undesirable.

Embodiments of the present invention disclose techniques to repack the Pancast video formats into standard video formats, without down-scaling. For example, in one embodiment, the MIVP 104 generates PanaCast video with a 200 degree field-of view (FOV) video and packs it inside a 1920×1080p video frame, as will be explained In one embodiment, the MIVP 104 is designed to generate stacked video with multiple stacks of varying pixel sizes. The stacks may vary across a number of frames.

Figure 5:
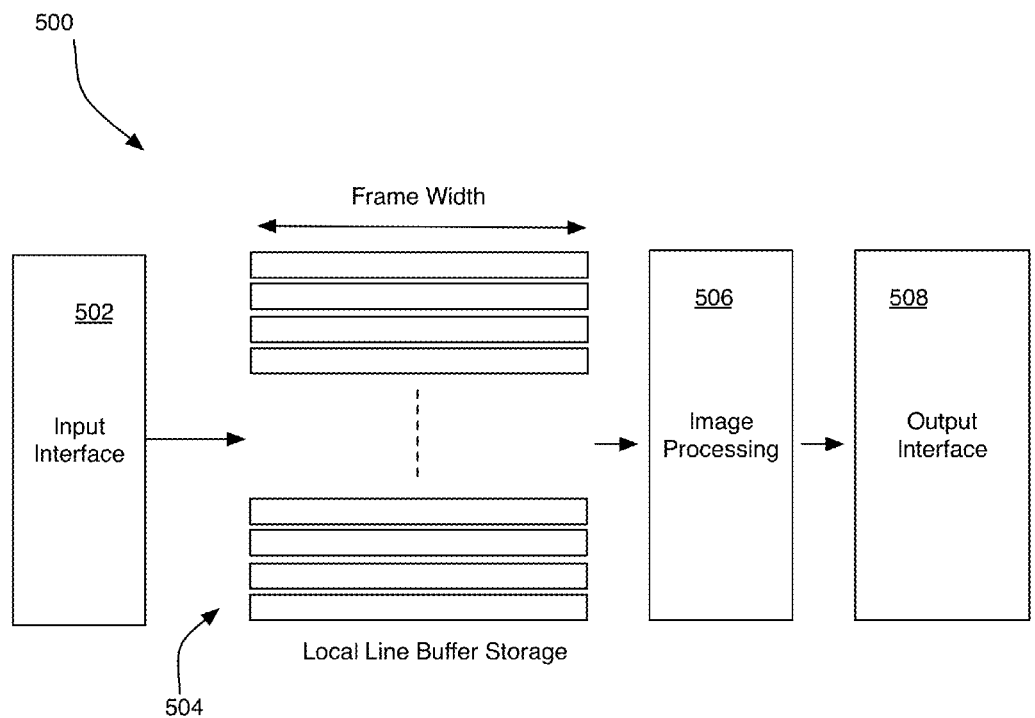
FIG. 5 illustrates how frame width is constrained by line buffer size.

To better understand the constraints on frame width when generating images, consider the image-processing pipeline 500 shown in FIG. 5. Referring to FIG. 5, an input interface 502 stores input/raw video in a line buffer 504 from where it is read by an image-processing block 506. The image-processing block 508 transforms the input video into final video by applying one or more image processing techniques on the input video. The final video is output to an output interface 512. The line buffer 504 has a fixed line width, which matches the frame width of images processed in the pipeline 500.

Repacking of PanaCast video into standard video formats may include at least one of a slicing operation and a stacking operation.

FIGS. 6-9 illustrates the slicing and stacking operations, in accordance with various embodiments.

Figure 6:
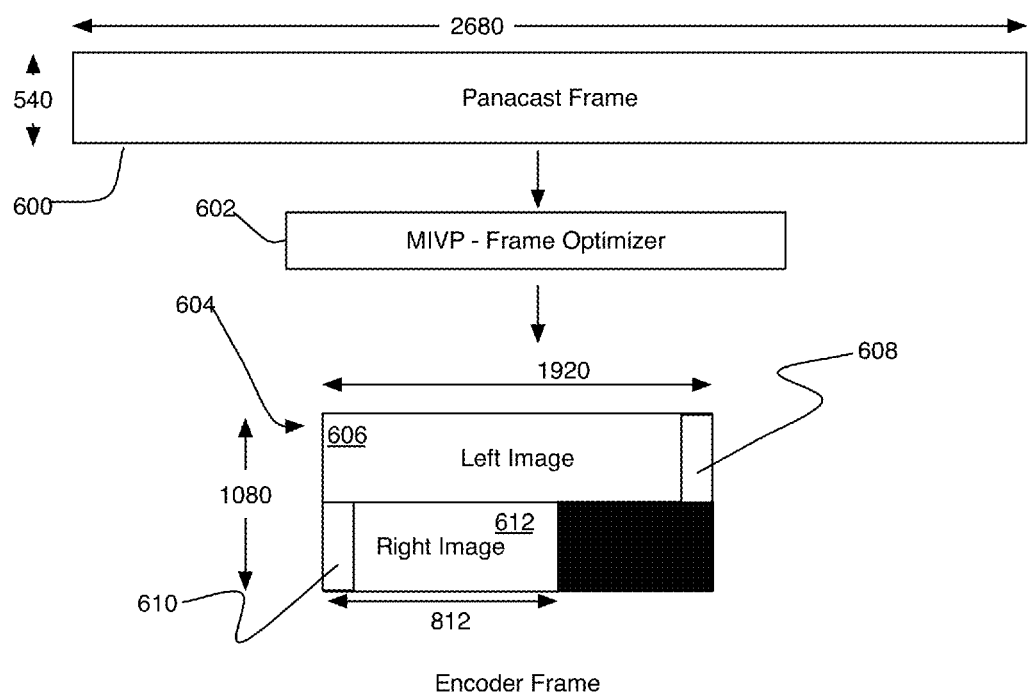
FIGS. 6-9 illustrate image repacking, in accordance with different embodiments of the invention.

Referring to FIG. 6, a PanaCast frame 600 has a width of 2680 pixels and height of 540 pixels. The PanaCast frame 600 is input into a frame optimizer 602, which may be a component of MIVP 104. The frame optimizer 602 performs a stacking operation to stack the input PanaCast frame 600 into an encoder frame 604. As will be seen, the encoder frame 604 has a width of 1920 pixels and height of 1080 pixels. Components of the encoder frame 604 include a left image 606 and a right image 612. As will be seen the left image 606 is stacked on top of the right image 610. The left image 606 includes an area 608 comprising 32 pixels, whereas the right image includes a left area 610 comprising 32 pixels. The regions 608 and 612 comprised overlapping pixels.

Figure 7:
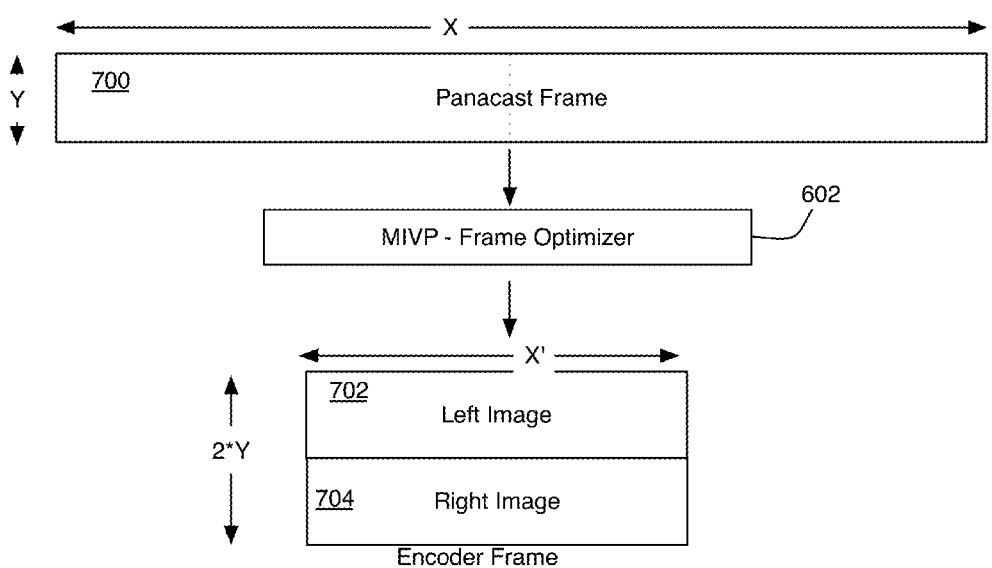

Referring to FIG. 7, a PanaCast frame 700 of size X by Y is fed into the frame optimizer 602 to produce a packed encoder frame 704. The packed encoder frame 704 has a width of X' and a height of 2*Y. To produce the packed encoder frame 704, the frame optimizer 702 performs a slicing operation to effectively slice the PanaCast frame 700 into a left image 706 and a right image 708. Thereafter, the frame optimizer 602 performs a stacking operation to stack the slice 706 on top of the slice 708. The width X' of the packed encoder frame 704 may match the line width of a memory buffer used in an image processing pipeline.

Figure 8:
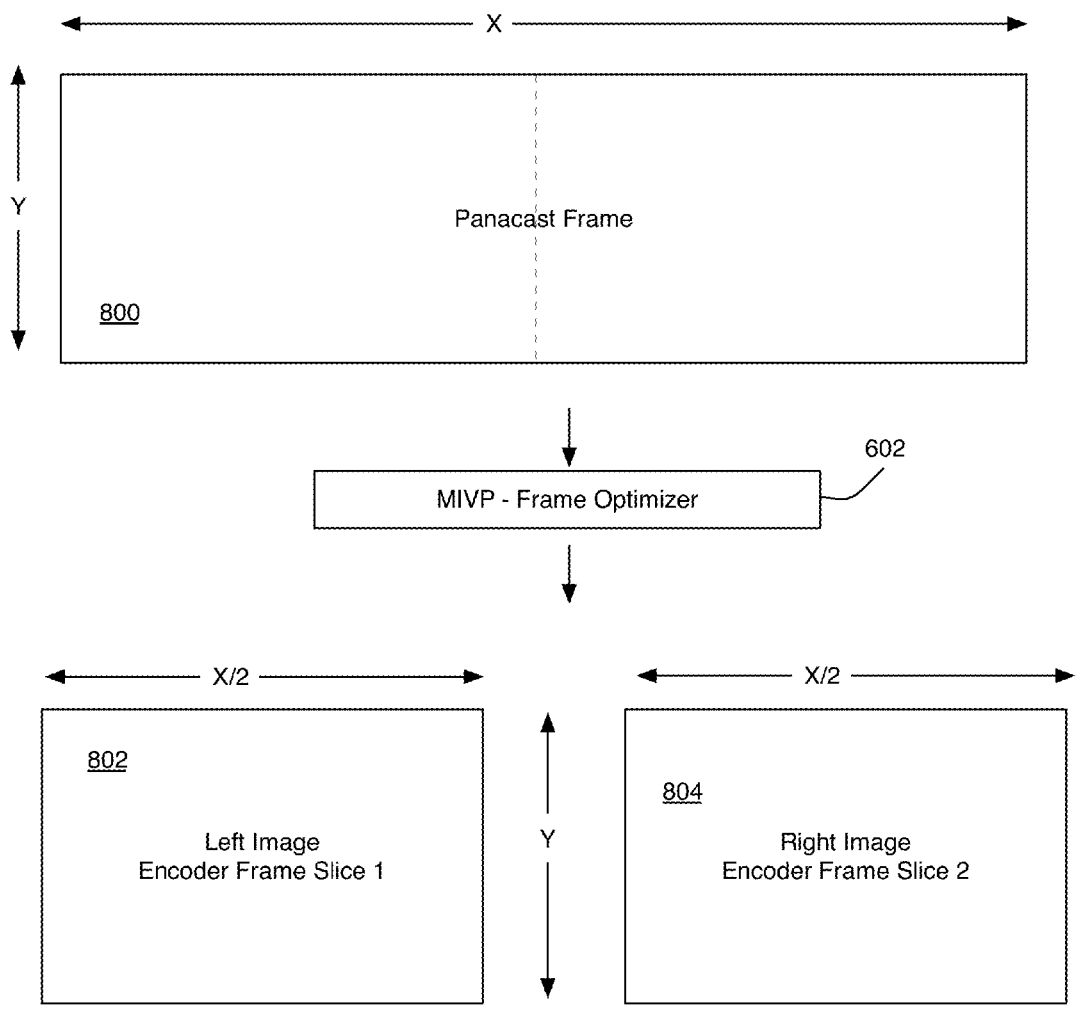

FIG. 8 of the drawing shows the case where a PanaCast frame 800 is packed by frame optimizer 602 into two standard resolution encoder frames 802, 804. As will be seen, the encoder frame 802 defines a left image corresponding to first slice of input PanaCast frame 800, and the encoder frame 804 defines right image corresponding to second a slice of the input PanaCast frame 800. Thus, in the example of FIG. 8, the frame optimizer 602 slices each input PanaCast frame 800 into a left image and a right image, but does not stack the left and right images.

Figure 9:
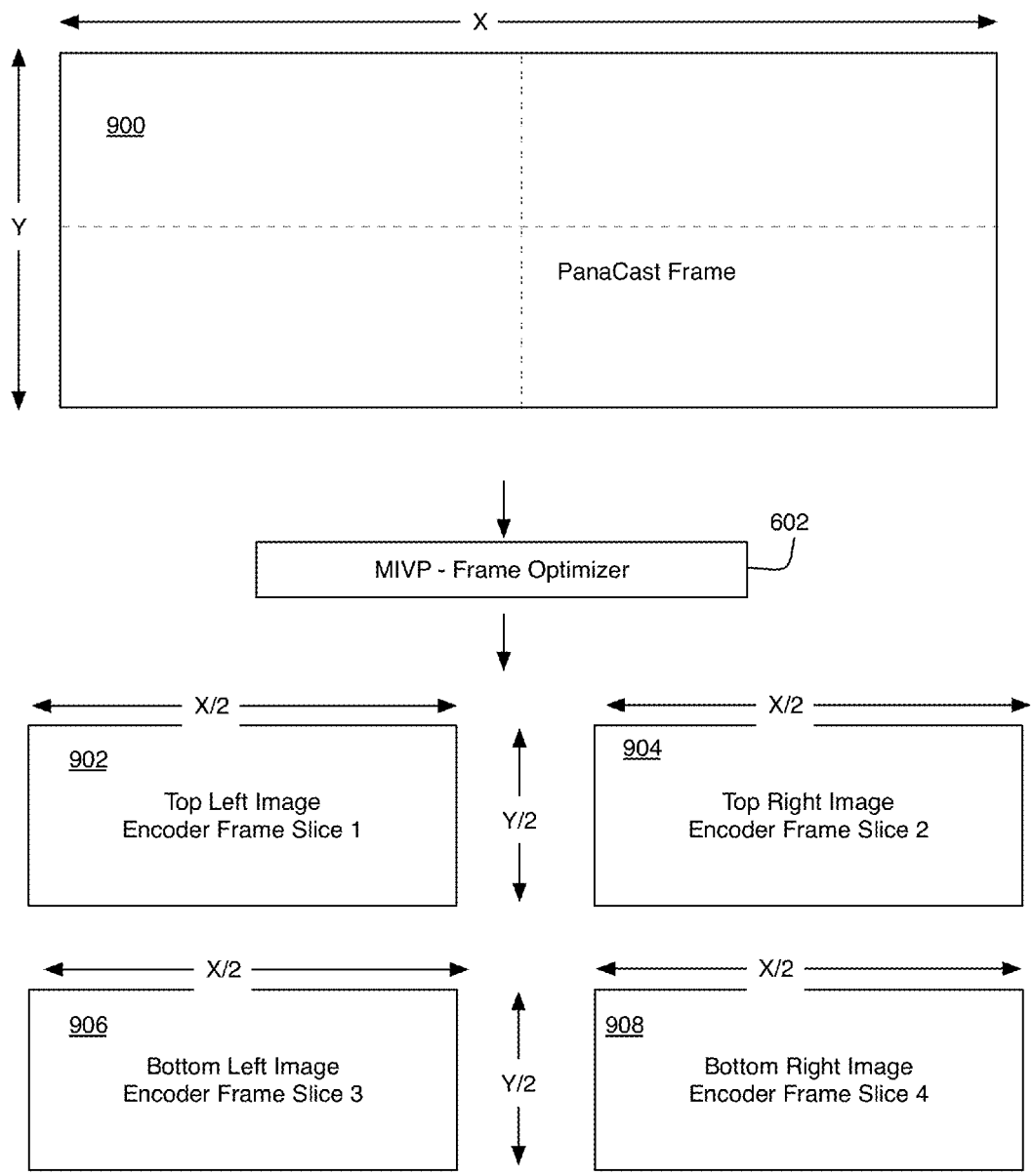

In the example of FIG. 9, and input PanaCast frame 900 is sliced into four portions by the frame optimizer 602. A top left image corresponding to a first slice is packed into encoder frame 902, a top right image corresponding to second slice is packed into encoder frame 904, a bottom left image corresponding to third slice is packed into encoder frame 906, and a bottom right image corresponding to fourth slice is packed into encoder frame 908.

Figure 10:
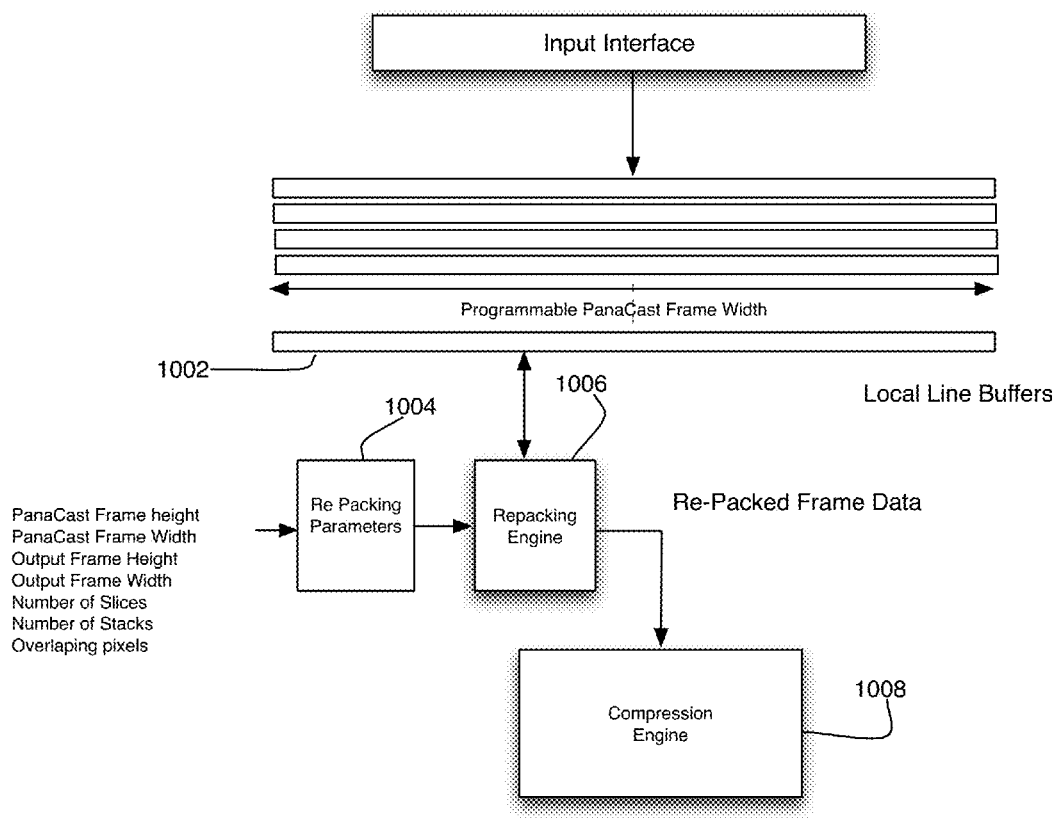
FIG. 10 shows a repacking architecture, in accordance with one embodiment of the invention.

The various form of repacking described above may be achieved by a repacking architecture implemented at least within the encoder 110. FIG. 10 shows an embodiment 1000 of the repacking architecture. Referring to FIG. 10, frame widths within local line buffers 1002 may be programmable. For example, as shown in table 300 of FIG. 3, a standard definition PanaCast frame may be programmed to include a frame width of 540 pixels whereas PanaCast HD image format may be programmed to include a frame width of 1080 pixels. Based on repacking parameters 1004, a repacking engine 1006 reads PanaCast frame data from the local line buffers 1002 and repacks the PanaCast frame data into the required number of stacks and slices for output to compression engine 1008. In one embodiment, the repacking parameters may include:

a) PanaCast frame height;
b) PanaCast frame width;
c) output (encoded) frame height:
d) output frame (encoded) width;
e) number of slices;
f) number of stacks; and
g) number of overlapping pixels.

Figure 11:
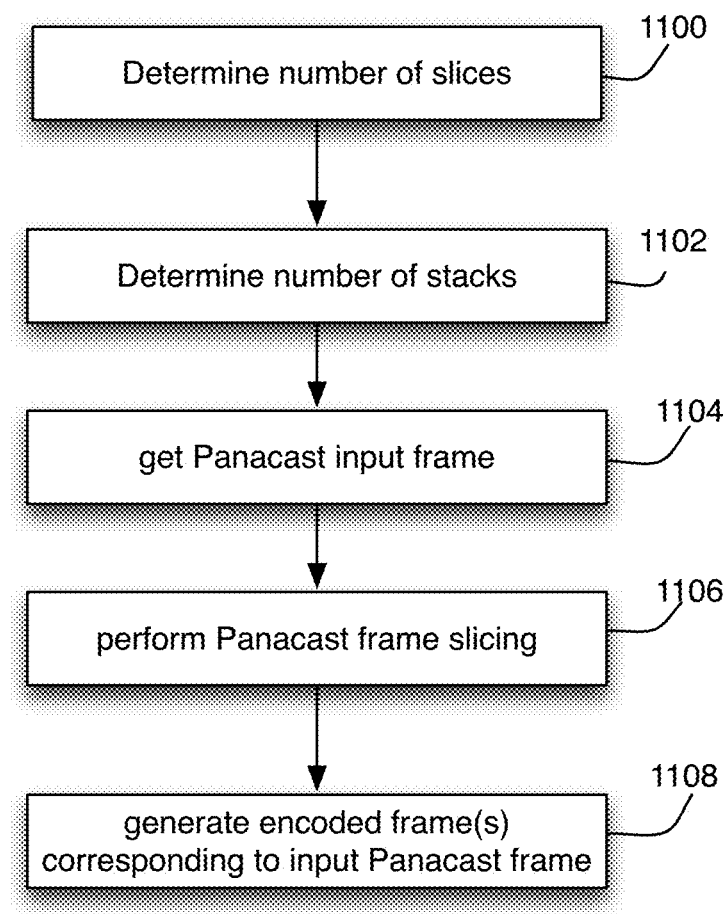
FIG. 11 shows a flowchart of operation performed when repacking images, in accordance with one embodiment of the invention.

FIG. 11 illustrates the steps in a repacking process flow implemented by repacking engine 1006, in accordance with one embodiment of the invention. Referring to FIG. 11, at block 1100, the repacking engine 1006 determines the number of slices. At block 1102, the repacking engine 1006 determines the number of stacks. It would be appreciated that the number of slices and the number of stacks will be dependent on the video format of output encoder frame, which in turn will be dependent on the physical limitations of the hardware for which video is being output. At block 1104, the repacking engine 1006 reads an input PanaCast frame and slices the input PanaCast frame according to the number of slices determined at block 1100. Thereafter, at block 1108, the repacking engine outputs an encoded frame (s) corresponding to the input PanaCast frame. Essentially, the encoded frame comprises the slices of the PanaCast input frame arranged into an appropriate number of stacks. In one embodiment, overlapping pixels may be added to frame edges of the slices, as can be seen in FIG. 6. These overlapping regions are dropped during unpacking of each frame. The overlapping regions typically may include stitching artifacts because of proximity to encoded frame edge.

Figure 12:
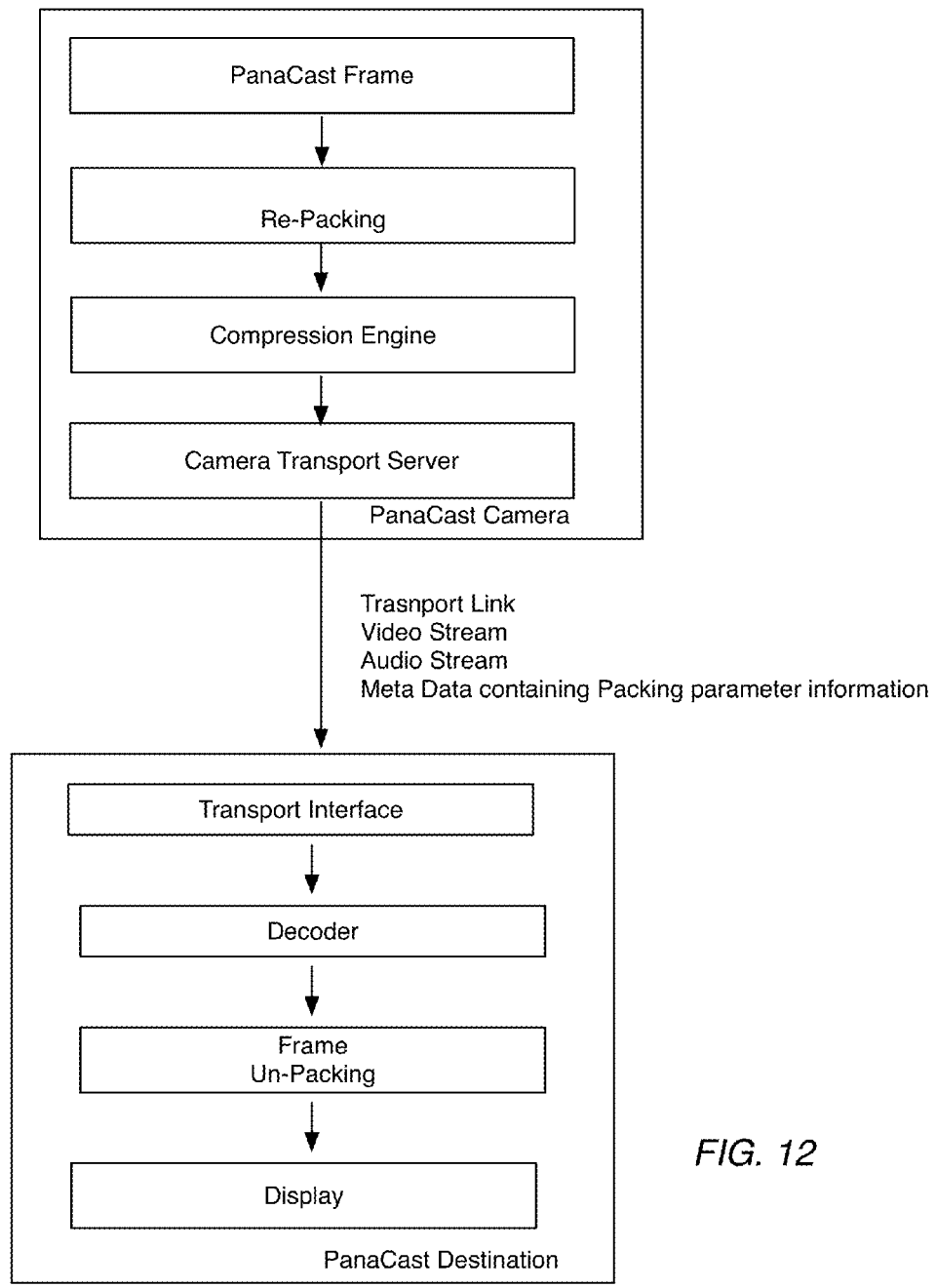
FIG. 12 illustrates the unpacking of images, in accordance with one embodiment of the invention.

FIG. 12 shows the operation performed to render an encoded PanaCast frame, in accordance to one embodiment. Referring to FIG. 12, on the encoding side, a PanaCast frame 1200 is input in the repacking engine 1006 and is compressed at 1204 before being transmitted to a PanaCast destination via a transport server. Included with a transmission of each encoded frame is metadata containing repacking parameters. The metadata may be encoded within each frame or out of band. At each PanaCast destination (a PanaCast destination may include any hardware capable of rendering video) the encoded PanaCast video is received at a transport interface 1214, decoded at 1216 and unpacked at 1218. The unpacking process uses the metadata, which contains the packing parameters information, to reverse the packing operation so that data in the encoded frame may be reassembled to produce the input PanaCast frames shown in FIGS. 6-9. The reassembled PanaCast frame is then rendered on display 1220.

In one embodiment, a viewer may choose to optimize the video to maximize vertical resolution by cropping side pixels or the viewer may choose to optimize for horizontal resolution by cropping top/bottom pixels. These options may be dynamically selected by a user while the video stream is being displayed. In one embodiment, the selection process may also be automated through detection and analysis of motion for a particular scene to implement the highest (or user-defined parameterized) format for that scene based on such real-time analysis of the content, etc. the details for this are shown in FIGS. 7-9.

To optimize for horizontal resolution, the image is broken into two segments, as shown in FIG. 6. The left image 606 is placed on top of the right image 612. The video is separated into two segments 608, 610 and arranged in a serpentine wrap-around one above the other to fit within the conventional video HD frame.

When the two images are placed back together after being encoded, visual artifacts can result from obtaining different edge pixels at the end of left section and the start of right section (especially with a high quantizer). To eliminate this visual issue, redundant pixels from the segments 608, 610 are used, in one embodiment. At the end of the left section, 60 pixels of redundant data may be placed. Similarly at the start of right, 60 redundant pixels may be placed. The purpose of these pixels is to reduce the visual impact from encoding artifacts when the two sections of the image are merged back into one video.

The number of redundant pixels selected may be chosen to support a variety of crop factors. To simplify reuniting the two sections into one image, it is important that they align on a pixel boundary for quality purposes. For example, if the number of overlapping pixels is 9, and a scale factor is used of 2, the final boundary would align to a half pixel boundary. Thus, the resulting image quality may be negatively affected or require more complicated processing. The number of redundant pixels may be selected to be divisible into multiple scale factors improve video quality. For instance 60 can be divided at pixel boundaries of 2, 1.5, 3, 10, 6, etc.

The wrap-around image can scale down at the camera. A few examples of the scale-down sizes include:

| ScaleDown | Scaled-down size |
|---|---|
| 1 | 1920 × 1080 |
| 1.5 | 1280 × 720 |
| 2 | 960 × 540 |
| 2.5 | 768 × 432 |
| 3 | 640 × 360 |
| 4 | 480 × 270 |
| 5 | 384 × 216 |
| 6 | 320 × 180 |
| 7.5 | 256 × 144 |
| 10 | 192 × 108 |

Numerous specific details may be set forth herein to provide a thorough understanding of a number of possible embodiments of a digital imaging system incorporating the present disclosure. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

The method of the present invention may be performed either in hardware, software, or any combination thereof, as those terms are currently known in the art. In particular, the present method may be carried out by software, firmware, or microcode operating on a computer or computers of any type, including preexisting or already-installed image processing facilities capable of supporting any or all of the processor's functions. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for transmitting panoramic video encoded at a higher resolution using an output encoding at a lower resolution, comprising:
determining repacking parameters comprising a number of slices into which to slice each input frame of the panoramic video; and a number of stacks associated with an output encoding; wherein said number of slices and stacks enable the said input frame to be encoded based on the output encoding without downscaling;
slicing each input frame into the number of slices; and
stacking each slice into encoded frames of the output encoding.

2. The method of claim 1, further comprising compressing each encoded frame.

3. The method of claim 1, further comprising transmitting the encoded frames to a video destination together with metadata to facilitate decoding of the encoded frames.

4. The method of claim 3, wherein the metadata comprises the number of slices.

5. The method of claim 3, wherein the metadata comprise the number of stacks.

6. A method for processing video, comprising:
determining repacking parameters for repacking input panoramic video encoded at a higher resolution into corresponding encoded panoramic frames encoded at a lower resolution without down-scaling;
performing a repacking operation to repack the input panoramic video into the encoded panoramic frames.

7. The method of claim 6, wherein the repacking parameters comprise a number of slices into which to slice each frame of the input panoramic video.

8. The method of claim 7, wherein the repacking parameters comprise a number of stacks into which to pack the slices in each encoded panoramic frame.

9. The method of claim 6, wherein the repacking parameters specify a number of overlapping pixels to include with adjacent slices.

10. Apparatus, comprising:
a processor; and
a memory, the memory storing instructions which when executed by the processor performs a method for processing, video, comprising:
determining repacking parameters for repacking input panoramic video encoded at a homer resolution into corresponding encoded panoramic frames encoded at a lower resolution without down-scaling;
performing a repacking operation to repack the input panoramic video into the encoded panoramic frames.

11. The apparatus of claim 10, wherein the repacking parameters comprise a number of slices into which to slice each frame of the input panoramic video.

12. The apparatus of claim 11, wherein the repacking parameters comprise a number of stacks into which to pack the slices in each encoded panoramic frame.

13. The apparatus of claim 10, wherein the repacking parameters specify a number of overlapping pixels to include with adjacent slices.

14. A non-transitory computer readable medium having stored thereon a sequence of instructions which when executed by a processor causes a system to perform a method for processing video, comprising:
determining repacking parameters for repacking input panoramic video encoded at a higher resolution into corresponding encoded panoramic frames encoded at a lower resolution without down-scaling;
performing a repacking operation to repack the input panoramic video into the encoded panoramic frames.

15. The computer readable medium of claim 14, wherein the repacking parameters comprise a number of slices into which to slice each frame of the input panoramic video.

16. The computer readable medium of claim 14, wherein the repacking parameters comprise a number of stacks into which to pack the slices in each encoded panoramic frame.

17. The computer readable medium of claim 14, wherein the repacking parameters specify a number of overlapping pixels to include with adjacent slices.

\* \* \* \* \*